(12) United States Patent
Relats et al.

(10) Patent No.: US 7,690,225 B2
(45) Date of Patent: Apr. 6, 2010

(54) FLEXIBLE PROTECTIVE CORRUGATED TUBE

(75) Inventors: Jordi Relats, Caldes De Montbui (ES); Pere Relats, Caldes De Montbui (ES); Dolors Artola, Caldes De Montbui (ES); Anna Fruns, Caldes De Montbui (ES)

(73) Assignee: Relats, S.A., Caldes De Montibui (Barcelona) (ES)

( * ) Notice: Subject to any disclaimer, the term of this patent is extended or adjusted under 35 U.S.C. 154(b) by 106 days.

(21) Appl. No.: 10/589,484

(22) PCT Filed: Jul. 29, 2005

(86) PCT No.: PCT/ES2005/000433

§ 371 (c)(1),
(2), (4) Date: Aug. 15, 2006

(87) PCT Pub. No.: WO2006/027399

PCT Pub. Date: Mar. 16, 2006

(65) Prior Publication Data

US 2007/0131302 A1   Jun. 14, 2007

(30) Foreign Application Priority Data

Aug. 5, 2004  (ES)  ............................... 200401956

(51) Int. Cl.
*D04B 1/22* (2006.01)

(52) U.S. Cl. .......................................... 66/170; 66/195
(58) Field of Classification Search .................. 66/170, 66/169 R, 195, 197, 200, 202, 179, 180, 181, 66/182, 183, 184, 178 R, 185; 138/123, 138/118.1, 121
See application file for complete search history.

(56) References Cited

U.S. PATENT DOCUMENTS

| | | | | |
|---|---|---|---|---|
| 3,044,497 | A * | 7/1962 | Rebut | 138/121 |
| 4,091,063 | A * | 5/1978 | Logan | 264/506 |
| 4,781,039 | A * | 11/1988 | Ribarev et al. | 66/80 |
| 6,711,920 | B2 * | 3/2004 | Akers et al. | 66/170 |
| 6,854,298 | B2 * | 2/2005 | Relats et al. | 66/203 |
| 7,269,978 | B2 * | 9/2007 | Giro Amigo | 66/195 |

* cited by examiner

*Primary Examiner*—Danny Worrell
(74) *Attorney, Agent, or Firm*—Jerald L. Meyer; Derek Richmond; Stanley N. Protigal

(57) ABSTRACT

The invention relates to a flexible protective corrugated tube (1) comprising at least two different yarns and a plurality of larger-diameter zones (2) and a plurality of smaller-diameter zones (3) which are alternated along the length of the tube (1). The inventive tube is characterized in that first yarns (4) form a weave of weft courses combined with stitch courses. In addition, the tube can comprise second yarns (5) which also form a weave of stitch courses combined with weft courses. In this way, the tube obtained has improved flexibility, adaptability and bendability.

9 Claims, 3 Drawing Sheets

FLEXIBLE PROTECTIVE CORRUGATED TUBE

The invention refers to a flexible corrugated tube made from a textile material for the protection of longitudinal substrates that has the peculiarity of giving improved flexibility, adaptability and bendability.

BACKGROUND TO THE INVENTION

The use of tubes made from a textile material to protect electrical cables, fluid ducting and gas pipes in aggressive areas as a result of vibrations, rubbing, significant temperature changes, impacts, the presence of dirt etc. is known and very widely used moreover in the electronic, aerospace, automobile and railway equipment industries. In addition said tubes are also used to provide sound insulation and RFI/EMI radiation screening.

The tubes described in the above paragraph and in particular tubes with a shaped longitudinal opening from flat bands, likewise the processes to obtain them are described in several patents such as: EP-A-1 236 822 (belonging to the same owner as the present application), U.S. Pat. No. 4,784,886 and U.S. Pat. No. 5,556,495.

All of these types of protective tube known up to the present time have the problem that, even though they have a high closing strength when they are made from flat bands, their flexibility and bendability are reduced in such a way that when they are applied on a bunch of cables or ducting in a straight or stretched position they do not have problems but when the element that must be covered is bent or must be bent after locating the protective tube there are difficulties in use due to the tube not being able to adapt to the shape of the substrate, thus opening up along the longitudinal cut, or making them take on a certain rigidity.

In U.S. 2003/0089971 a protective tube is described with similar characteristics to that which is obtained in the process described in the present invention but the process to obtain it is different and much more complicated. Specifically three possible methods are described to obtain a corrugated fabric tube with a peak and trough profile.

- By using monofilament yarns and multifilament yarns in a combined manner.
- By placing some rigid monofilament yarn rings on a fabric base structure made up of more flexible yarns.
- By the combination of zones on the fabric with a greater density of stitch courses with a lesser density of stitch courses.

DESCRIPTION OF THE INVENTION

With the protective tube of the invention the solving of the above mentioned disadvantages is achieved, obtaining other advantages that will be described.

The flexible protective corrugated tube of the invention comprise at least two different yarns and a plurality of larger diameter zones and smaller diameter zones which are alternated along the length of the tube. The protective tube is characterised in that first yarns form a weave of weft courses combined with stitch courses.

In an alternative embodiment the tube can comprise second yarns which also form a weave of stitch courses combined with weft courses.

By preference, the weave and weft of the first and second yarns are connected to each other in such a way that when the second yarns make the weave the first yarns are inserted in the form weft, and vice versa.

Advantageously, the tube of this present invention has some third yarns that form stud chain linking.

In accordance with the preferred embodiment, said first yarns are monofilament made from polyester with a 0.22 mm diameter; and said second yarns are monofilament polyamide with a 2.20 mm diameter; and said first yarns are multifilament made from 330 dtex polyester.

Thanks to the presence of areas of greater diameter alternated with areas of lesser diameter, the tube of this present invention has excellent flexibility and bendability which means the tube neither opens up along the longitudinal cut nor does it collapse or bend when it is applied to bunches of cables or conducts with small radius curves or that must be bent subsequent to the application of the protective tube, for the same reasons it can be adapted with maximum adaptability to the shape of any curved substrate without this increasing its rigidity which would bring about problems during installation.

A fabric tube is obtained with a high degree of flexibility resulting from its own stitched structure without the need to combine yarns of other types or thicknesses to form peaks and troughs nor having to combine other weave densities. The result is a tube that is much simpler to manufacture than those previously described, with lower financial cost and that can made with standard knitting looms.

BRIEF DESCRIPTION OF THE DRAWINGS

In order to give a greater understanding of that stated above some drawings are attached in which a practical embodiment is made that is by way of example but not by way of being a limitation.

BRIEF DESCRIPTION OF A PREFERRED EMBODIMENT

Figure 1:
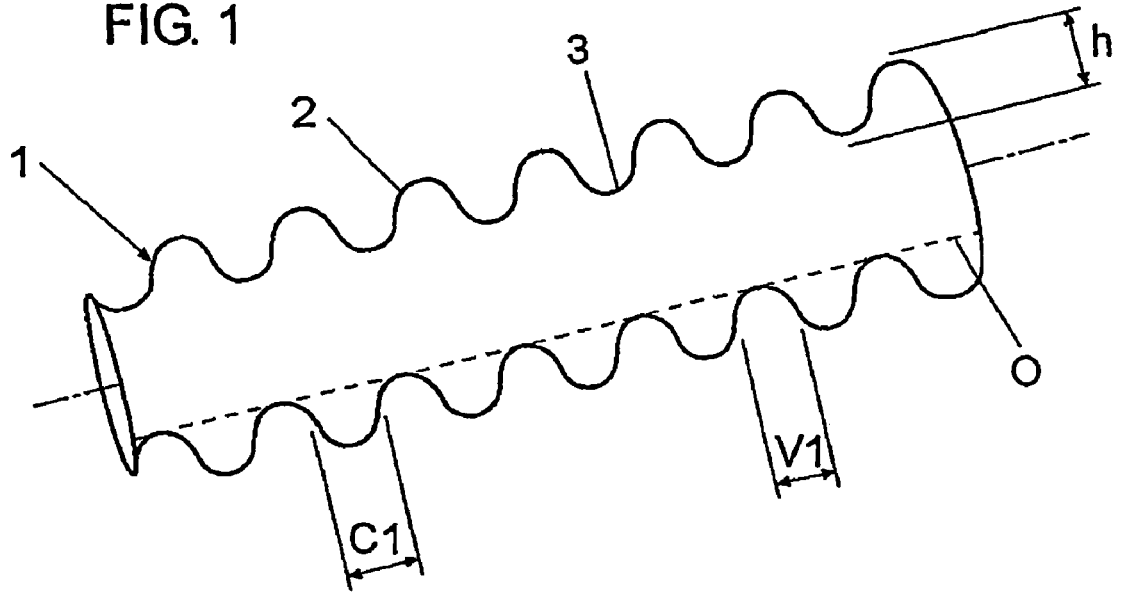
FIG. 1 is a perspective view of a section of the protective tube of this present invention.

The effect of a tube (1) with areas having a greater cross section (2) alternated with areas of lesser cross section (3) is achieved by means of a weave of weft courses obtained with two or three rows of pins. Below is a description of two preferred embodiments:

1) Warp knitted fabric obtained by using a Raschel type knitting machine with two rows of pins or on a circular machine with two thread guide rings.

Weave structure: (see the drawing with the weave and threading structure).

| P-1 | P-2 | | |
|-----|-----|---|---|
| 2-0 | 0-0 | } | × n1 |
| 0-2 | 8-8 | | |
| 2-0 | 2-0 | } | × n2 |
| 0-2 | 6-8 | | |

The row of pins 1 (P-1) make a weave of chain stitches to make the structure of the fabric. The row of pins 2 (P-2) makes a weave of weave-weft courses which is what gives the tube its peak and trough profile (ringed or corrugated). The weave area named as n1 defines the trough area (V1), the weave area named n2 defines the peak area (C1). The length or width of each peak (C1) is determined by the amount of times that the n2 weave is consecutively repeated. The length or width of each trough (V1) is determined by the number of times the weave area n1 is repeated consecutively. By varying the weaving sequence it is possible to modify the length or width of each peak and trough at will and make the peaks and troughs have the same or different lengths, thus it is possible to obtain tubes with degrees of flexibility suitable for each application and degree of curvature of the longitudinal substrate to be covered.

Figure 3:
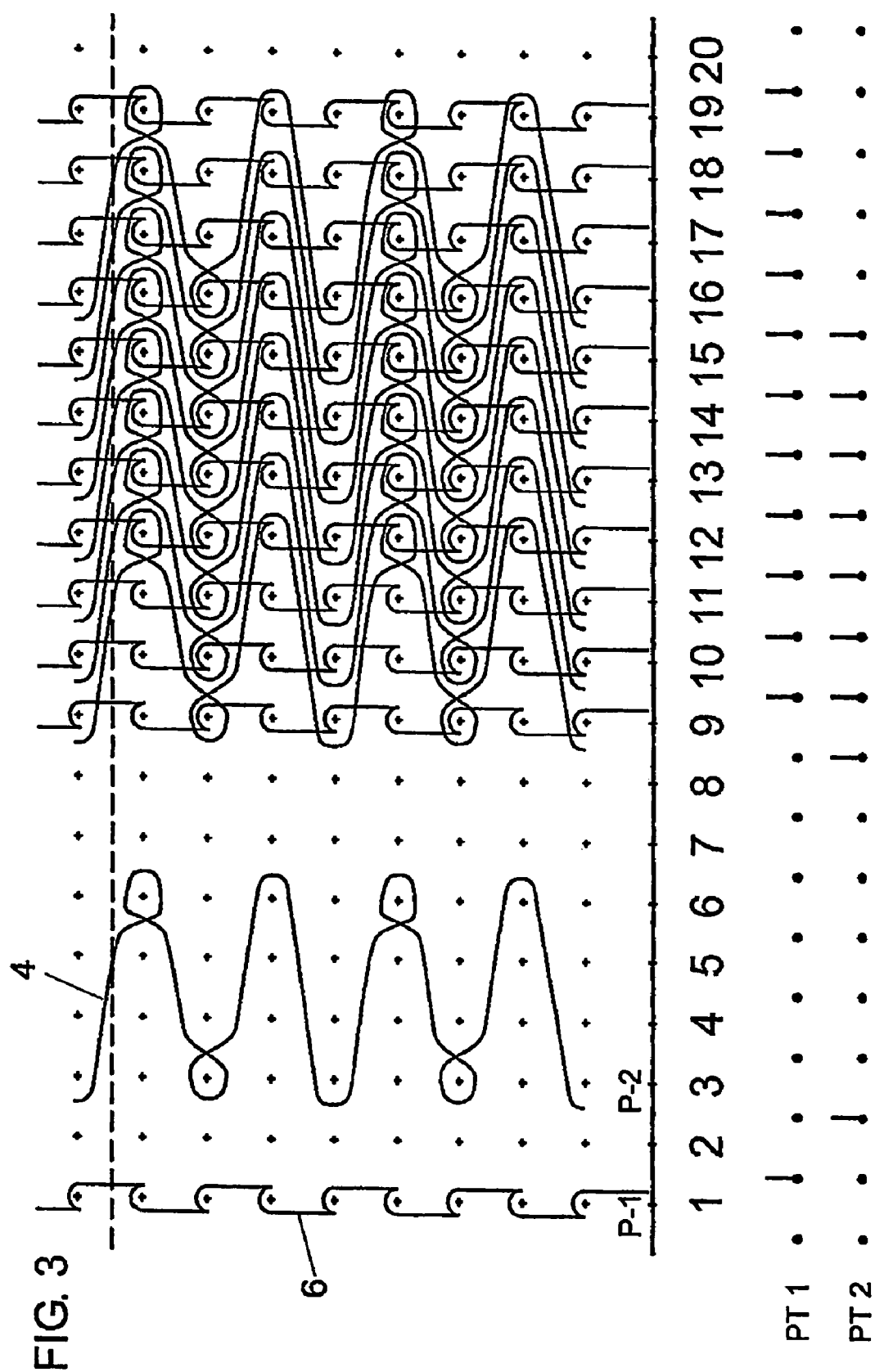
FIG. 3 is an outline of a first embodiment of the protective tube of this present invention.
Figure 4:
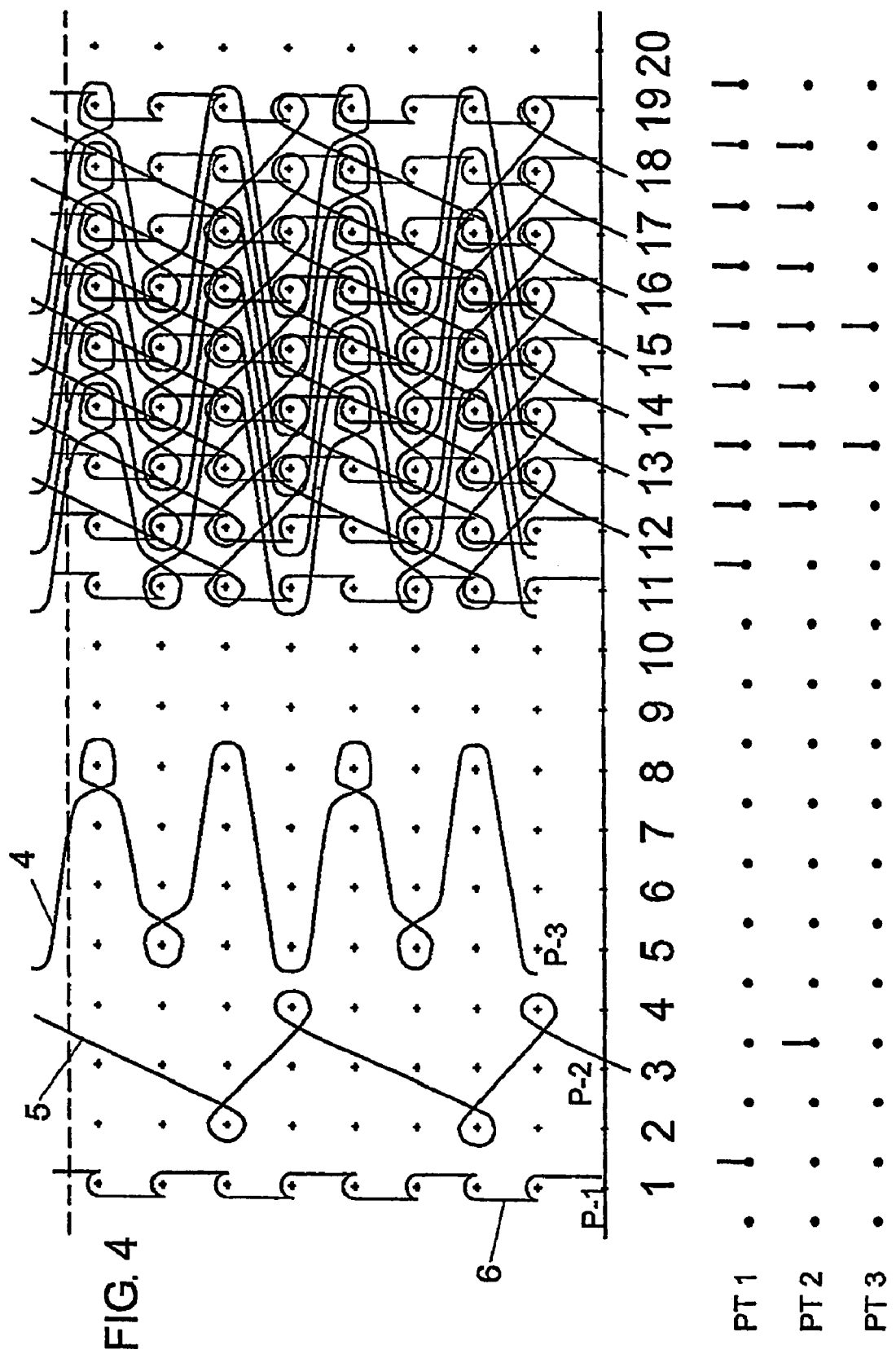
FIG. 4 is an outline of a second embodiment of the protective tube of this present invention

This ringed tube effect caused by the weave structure can be carried out for different types of yarn and course density, thus not being dependent on the fabric's parameters. In whichever case below the parameters that have been used for this preferred embodiment will be detailed:

Thread P-1: 330 dtex polyester multifilament (Third threads 6, FIGS. 3 and 4).

Thread P-2: 0.22 mm diameter polyester monofilament (First threads 4, FIGS. 3 and 4).

Threading P-1: all the thread pins threaded

Threading P-2: all the thread pins threaded

Needle gauge: 14 needles per inch

Course density: 6.0 courses at 10 mm of tube length

2) Warp knitted fabric obtained by using a Raschel type knitting machine with three rows of pins.

Weave structure: (see the drawing with the weave and threading structure).

| P-1 | P-2 | | P-3 | |
|---|---|---|---|---|
| 2-0 | 0-0 | } × n1 | 8-8 | } × n1 |
| 0-2 | 4-6 | | 0-0 | |
| 2-0 | 4-4 | } × n2 | 6-8 | } × n2 |
| 0-2 | 2-2 | | 2-0 | |

The row of pins 1 (P-1) make a weave of chain stitches to make the structure of the fabric. The row of pins 2 (P-2) and 3 (P-3) makes a weave of combined stitch-weft courses in such a way that when the yarns of P-2 make stitches courses of P-3 they are inserted in the form of wefts and vice versa. Just the same as in the previous embodiment, the weave area named as n1 defines the trough area (V1), the weave area named as n2 defines the peak area (C1). The length or width of each trough (C1) is determined by the number of times the weave area n2 is consecutively repeated. The length or width of each trough (V1) is determined by the number of times the weave area n1 is consecutively repeated.

The difference between the fabric tube obtained in this embodiment and that obtained in the previous embodiment lies in the fact that the tube in the second embodiment, due to the use of the second row of threading pins with monofilament yarn is that it offers higher resistance to friction and bending still keeping flexibility and bendability, although lower than in the previous case, but still much higher than with conventional tubes. In the tube obtained in this second embodiment, the distance (h) between the bottom of the troughs and the top of the peaks is reduced in comparison with the tube of the first embodiment; this variation is what brings about the reduction in flexibility and bendability. It can thus be clearly seen that by varying the weave structure of the yarns, it is possible to have an effect on tube flexibility and bendability apart from that produced by the different types of yarn used and the density of the stitches with which it is woven.

Below the parameters that have been used for this second preferred embodiment will be detailed:

Thread P-1: 330 dtex polyester multifilament (Third threads 6, FIGS. 3 and 4).

Thread P-2: 0.20 mm diameter polyamide monofilament (Second threads 5, FIG. 4).

Thread P-3: 0.22 mm diameter polyester monofilament (First threads 4, FIGS. 3 and 4).

Threading P-1: all the thread pins threaded

Threading P-2: all the thread pins threaded

Threading P-3: all the thread pins threaded

Needle gauge: 14 needles per inch

Course density: 6.0 courses at 10 mm of tube length

FIG. 1 shows an example of the protective tube obtained with the procedure of the present invention in which the following are detailed:

1: protective tube

2: section with greater diameter (peak)

3: section with lesser diameter (trough)

C1: length of the area having greater diameter

V1: length of the area having lesser diameter h: distance that defines the difference between the radius of the segment of greater diameter and the radius of the segment of lesser diameter.

O: line that defines the longitudinal opening of the tube.

Figure 2:
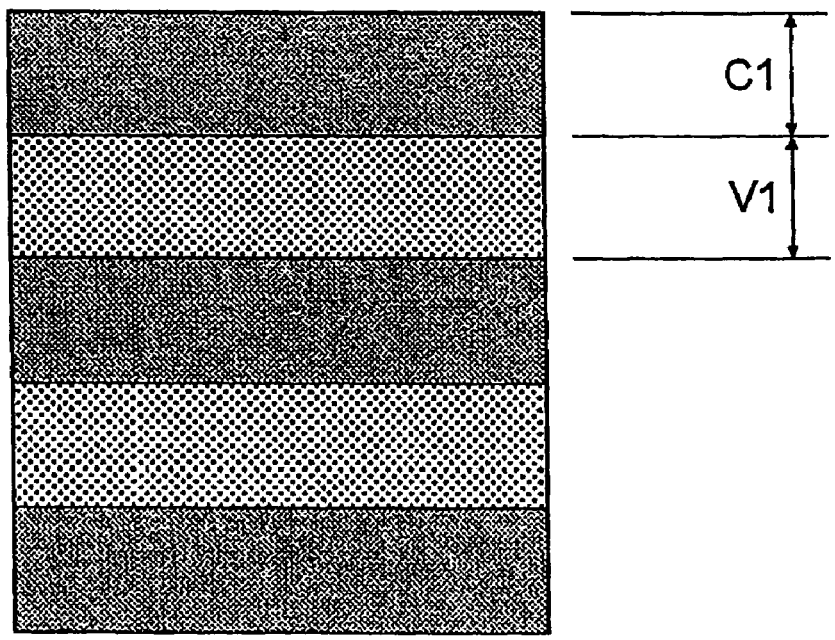
FIG. 2 is a plan view of the fabric band prior to its being shaped into a tube.

In FIG. 2 an example of a band of fabric is shown that is obtained from the procedure of this present invention prior to the shaping of the tube in which it shows:

C1: length of the segment of fabric with the weave of the yarns that will shape the areas of greater diameter (peak) in the tube.

V1: length of the segment of fabric with the weave of the yarns that will shape the areas of lesser diameter (trough) in the tube.

In spite of the fact that reference has been made to a specific embodiment of the invention, it is clear for an expert in the subject to see that the protective tube described is capable of having numerous variations and modifications, and that all of the details mentioned can be substituted by others that are technically equivalent, without setting aside the sphere of protection defined for the attached claims.

The invention claimed is:

1. Flexible protective corrugated tube comprising at least two different yarns and a plurality of larger diameter zones and smaller diameter zones which are alternated along the length of the tube, characterized in that some first yarns form a weave of weft courses combined with stitch courses, wherein the structure of the fabric comprises a weave of chain stitches from a first row of pins and a weave of weave-weft courses from a combination of one or more subsequent rows of pins to give the tube a peak and trough profile, the tube thereby forming a structure characterized by trough areas and peak areas, the length or width of each trough determined by a repetition of at least one weave area, whereby a variation in the weave structure of the yarns has an effect on tube flexibility and bendability apart from that produced by the different types of yarn used and the density of the stitches.

2. A tube according to claim 1, characterized in that said tube also has some second yarns which also form a weave of stitch courses combined with weft courses.

3. A tube according to claim 1, characterized in that the stitch course and the weft course of the first and the second yarns are combined in such a way that when the second yarns make the stitches the first yarns are inserted in the form of wefts and vice versa.

4. A tube according to claim 1, characterized in that said tube includes some third yarns that form a weave with the chain stitches.

5. A tube according to claim 1, characterized in that said first yarns are 0.22 mm diameter polyester monofilament.

6. A tube according to claim 2, characterized in that said second yarns are 0.20 mm diameter polyamide monofilament.

7. A tube according to claim 4, characterized in that said first yarns are 330 dtex polyester multifilament.

8. A tube according to claim 1, characterized in that said first yarns in the subsequent rows comprise a second row of pins, the yarns from the second row of pins making a weave of weave-weft courses, including first and second weave areas, wherein the first weave areas define the trough areas and the second weave areas define the peak areas, the length or width of each peak area and trough area determined by an amount of times of consecutive repetition of the respective courses.

9. A tube according to claim 1, characterized in that said first yarns the subsequent rows comprise second and third rows of pins, the second and third rows of pins making a weave of combined stitch-weft courses in such a way that the yarns form of wefts, a length or width of each peak and trough determined by consecutive repetition of respective weave areas.

* * * * *